MEXWORTH D. DRAKE, OF SCITUATE, ASSIGNOR TO HIMSELF AND WILLIAM E. BARRETT, OF PROVIDENCE, RHODE ISLAND.

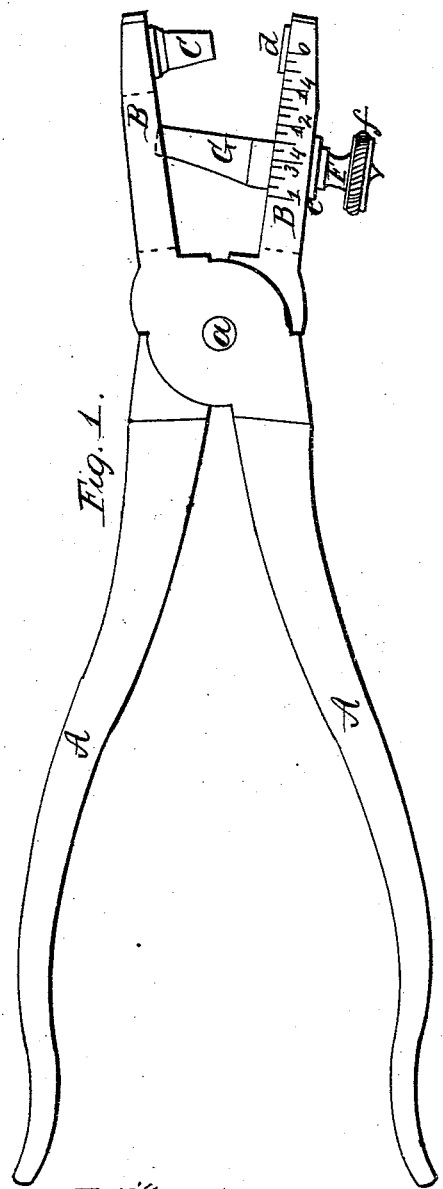
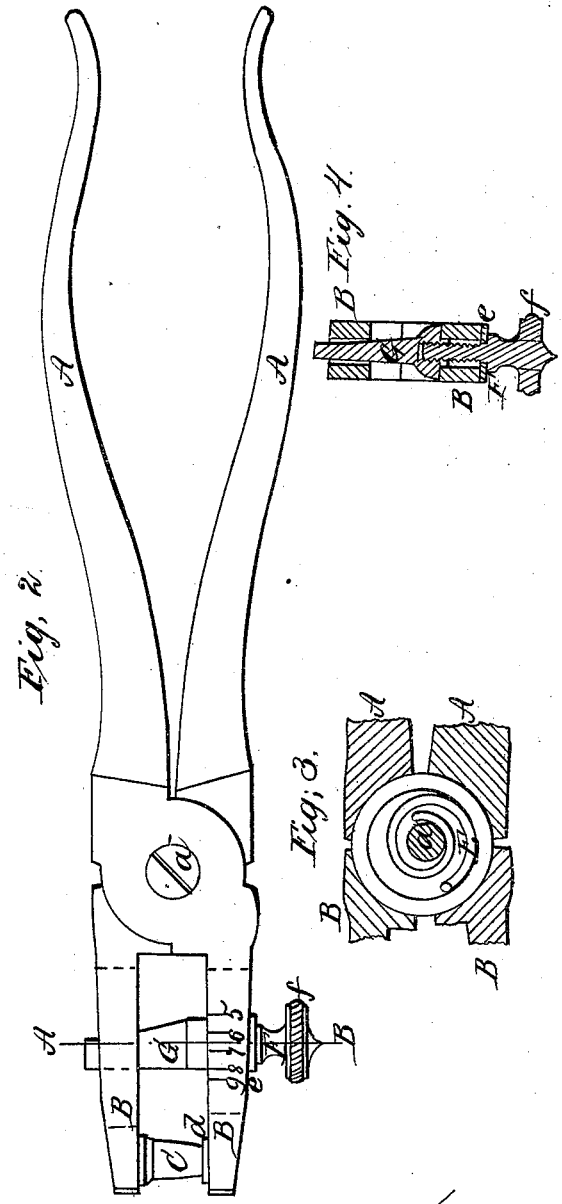

Letters Patent No. 85,575, dated January 5, 1869.

IMPROVEMENT IN BELT-PUNCHES.

The Schedule referred to in these Letters Patent and making part of the same.

*Know all men by these presents:*

That I, MEXWORTH D. DRAKE, of Scituate, in the county of Providence, and State of Rhode Island, have invented certain new and useful Improvements in Belt-Punches; and I do hereby declare that the following is a full, clear, and exact description of the same, reference being had to the accompanying drawings, forming a part of this specification, in which—

Figure 1 represents a view of the right-hand side of my improved belt-punch with the jaws open;

Figure 2 represents a view of the left-hand side of the same with the jaws closed;

Figure 3 represents a vertical section through the joint; and

Figure 4 represents a transverse section through the jaws and gauge on line A B, fig. 2.

To enable those skilled in the art to which my invention belongs, to make and use the same, I will proceed to describe it more in detail.

The nature of my invention consists—

First, in the combination, with the jaws of a belt-punch, of an adjustable gauge, in the peculiar manner hereinafter explained.

Second, in a belt-punch, the lower jaw of which is provided with a gauge and a scale on each side, as shown and described.

My improved belt-punch is constructed as follows:

Two levers, made in the form shown in the drawings, are pivoted to each other by a bolt or screw, $a$. Their longer arms extend back, forming the handles A, and their shorter arms project forward to form the jaws B.

The upper jaw is provided, near its end, with a cutter, C, of the usual form used in belt-punches, and upon the lower jaw is arranged a disk, $d$, upon which the cutter C strikes when the jaws B are closed.

In the central part of the joint, between the two levers, is a circular opening, containing a spiral-wire spring, D, which throws the jaws B apart, when there is no counteracting force.

The ends of the spring are secured to the levers by being bent at right angles and fitting into holes formed for that purpose, one in each lever.

The jaws B are slotted longitudinally, and to the lower one is secured a gauge, G, by means of a set-screw, F, having a milled head, $f$, by which it can be turned, and by means of said screw the gauge is made adjustable.

The screw F passes through the slot into the end of the gauge G, and has upon it a washer, $e$, which rests against the outside of the jaw B, as indicated in the drawings.

The gauge extends upward across the space between the jaws B, and passes through the slot in the upper jaw. It is made square upon its face, against which the edge of the belt or other material to be punched is placed.

Upon the right-hand side of the lower jaw is engraved a scale of an inch. and fractional parts thereof, measuring from a point in line with the centre of the cutter C, and, by setting the gauge G by this scale, the holes may be punched uniformly at the required distance from the edge of the belt or other article.

Upon the left-hand side of the lower jaw is engraved a different scale, as indicated in fig. 2, marked 5, 6, 7, 8, 9. This scale is more especially for belts, and the numbers indicate at what point the gauge should be set in order to punch the belts to receive the corresponding size of belt-hooks.

The use of belt-hooks is, by most manufacturers, preferred to the use of lacings, but a great difficulty in their use has been that operatives, being unskilful, would punch the holes at irregular and unequal distances from the ends of the belt, so that there would be unequal strain upon the different hooks, and they would either tear out by too much tension, or work loose by too little, or, by punching too near the edge, the ends of the belt would not be brought evenly together by the size of the hooks used.

By the use of my punch, all of these difficulties are obviated.

The operation is as follows:

The belt or other material to be punched is placed between the jaws B, its edge resting against the gauge G, which is previously set at the desired distance; then by grasping the handles in the hand, and pressing them together, the cutter C is brought down and cuts the hole required.

By the foregoing description, it will be seen that I have constructed a belt-punch that may be easily regulated to cut the holes uniformly and rapidly, thereby making it a very desirable instrument for mill-owners, harness-makers, and others who use such tools.

Having described my improved belt-punch,

What I claim therein as new, and of my invention, and desire to secure by Letters Patent, is—

1. The combination, with the slotted jaws B and cutter $c$, of an adjustable gauge, G, extending through both the said upper and lower jaws, substantially as and for the purpose set forth.

2. A belt-punch, in which the jaws and punching-devices are combined with an adjustable gauge, such as described, and a scale to indicate the number or size of the hook for which the holes are punched, as herein shown and set forth.

MEXWORTH D. DRAKE.

Witnesses:
J. J. MARKLAND,
JAMES H. PARSONS.